United States Patent
Yamanami et al.

(10) Patent No.: US 8,083,263 B2
(45) Date of Patent: Dec. 27, 2011

(54) TANK-CARRYING VEHICLE REAR BODY STRUCTURE

(75) Inventors: Hiroyuki Yamanami, Isehara (JP); Hideo Takagi, Yokohama (JP); Tsutomu Suzuki, Yamato (JP); Yusuke Furukawa, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 188 days.

(21) Appl. No.: 12/473,961

(22) Filed: May 28, 2009

(65) Prior Publication Data

US 2009/0309349 A1    Dec. 17, 2009

(30) Foreign Application Priority Data

Jun. 11, 2008 (JP) ................................. 2008-152869
Jan. 16, 2009 (JP) ................................. 2009-007338

(51) Int. Cl.
*B62D 21/15* (2006.01)

(52) U.S. Cl. ........................................ 280/830; 280/834

(58) Field of Classification Search .................. 280/830, 280/834

See application file for complete search history.

(56) References Cited

U.S. PATENT DOCUMENTS

| | | | | |
|---|---|---|---|---|
| 4,093,254 A | * | 6/1978 | Ezaki | 280/783 |
| 5,114,184 A | * | 5/1992 | Shimomura et al. | 280/784 |
| 6,672,620 B2 | * | 1/2004 | Kawazu et al. | 280/834 |
| 6,824,168 B2 | * | 11/2004 | Kawazu et al. | 280/834 |
| 7,063,355 B2 | * | 6/2006 | Hashimura | 280/830 |
| 7,198,301 B2 | * | 4/2007 | Wozniak et al. | 280/830 |
| 7,264,277 B2 | * | 9/2007 | Ono et al. | 280/830 |
| 7,819,431 B2 | * | 10/2010 | Minami | 280/834 |
| 2003/0042057 A1 | | 3/2003 | Kawazu et al. | |
| 2003/0047932 A1 | * | 3/2003 | Kawazu et al. | 280/830 |
| 2004/0239095 A1 | | 12/2004 | Wozniak et al. | |
| 2005/0161935 A1 | | 7/2005 | Ono et al. | |
| 2006/0017253 A1 | | 1/2006 | Kye | |

FOREIGN PATENT DOCUMENTS

EP    1 447 257 A2    8/2004
JP    HEI 8-175421    7/1996

* cited by examiner

*Primary Examiner* — Joanne Silbermann
*Assistant Examiner* — Michael Stabley
(74) *Attorney, Agent, or Firm* — Young Basile (57) ABSTRACT

A gas tank is protected by absorbing collision energy with the rear of a vehicle. Rear-side tank frame supports the tank at a position below a rear side member. The front portion of the tank frame is secured on rear side member, while the rear portion is directly or indirectly secured thereto. A torsion beam is arranged ahead of the tank frame. When an input load is exerted at rear end portions of the rear side member and tank frame toward the front of the vehicle, rear side member is folded to a V shape, upward with respect to the vehicle body. The tank frame collides with the torsion beam, and the front portion of the tank frame is pushed upward along with rear side member.

19 Claims, 12 Drawing Sheets

TANK-CARRYING VEHICLE REAR BODY STRUCTURE

CROSS-REFERENCE TO RELATED APPLICATIONS

This application claims priority from Japanese Patent Application Serial Nos. 2008-152869, filed Jun. 11, 2008, and 2009-007338, filed Jan. 16, 2009, each of which is incorporated herein in its entirety by reference.

TECHNICAL FIELD

The invention pertains to a tank-carrying vehicle rear body structure.

BACKGROUND

In Japanese Kokai Patent Application No. Hei 8[1996]-175421, a fuel tank is arranged on rear side members. In the rear portion of the fuel tank, a first crumpling induction part is arranged, and, at the same time, in the front portion, a second crumpling induction part is arranged. The central line of the cross section of the rear end of the rear side members is located lower than the central line of the cross section of the first crumpling induction part. Under an input load applied from the rear of the vehicle, the rear side members are folded from the first crumpling induction part and the second crumpling induction part to wrap up the fuel tank in order to protect it.

BRIEF SUMMARY

The invention provides embodiments of a tank-carrying vehicle rear body structure having a tank frame for supporting the tank arranged below a pair of rear side members. In this tank-carrying vehicle rear body structure, the front portion of the tank frame is secured on the rear side members, and, at the same time, the rear portion of the tank frame is directly or indirectly secured on the rear side members.

Also, the tank-carrying vehicle rear body structure has a member-folding-facilitating part. When an input load toward the front side of the vehicle is applied to the rear body structure such that the rear side members are folded such that the upper portion of the rear body structure becomes convex, the member-folding-facilitating part aids the folding.

As a result, the rear side members are folded significantly, and the amount of crushing of the rear portion of the vehicle can be increased. The amount of energy of the input load absorbed by the entire rear portion of the vehicle is increased, and crushing of the gas tank can be prevented. No reinforcement member may be needed, so the weight and cost of the vehicle can be reduced.

Variations and details of this embodiment and others are discussed in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

According to the technology described in Japanese Kokai Patent Application No. Hei 8[1996]-175421, crumpling induction parts are arranged ahead and behind the fuel tank, respectively, so that the rear side members are folded upon application of the input load to wrap up the fuel tank so that the fuel tank is not crushed.

However, the amount of energy that can be absorbed is limited when folding the rear side members in order to protect the fuel tank. In particular, because the fuel tank described therein is made of resin or thin sheet metal or the like, the range of the rear side members for folding of the first and second crumpling induction parts is small in order to protect the fuel tank. Therefore, the amount of energy that can be absorbed by folding the rear side members is limited. Also, the bending portions (kick-up portions) of the rear side members have relatively low strength, so they are reinforced by a suspension part known as a suspension member so that they cannot be easily folded. Consequently, the amount of energy that can be absorbed at the bending portions while in folding mode is small.

To absorb more energy, the remaining frame portions of the vehicle body have to be reinforced, leading to an undesirable increase in weight and cost.

In contrast, embodiments of the invention provide a tank-carrying vehicle rear body structure that can absorb the energy through the entirety of the rear portion of the vehicle to protect the tank. As a result, the reinforcement member formerly adopted may not be needed, allowing the weight and cost to be reduced.

In the following, an explanation will be given in more detail regarding specific embodiments of the invention with reference to the figures.

Figure 1:
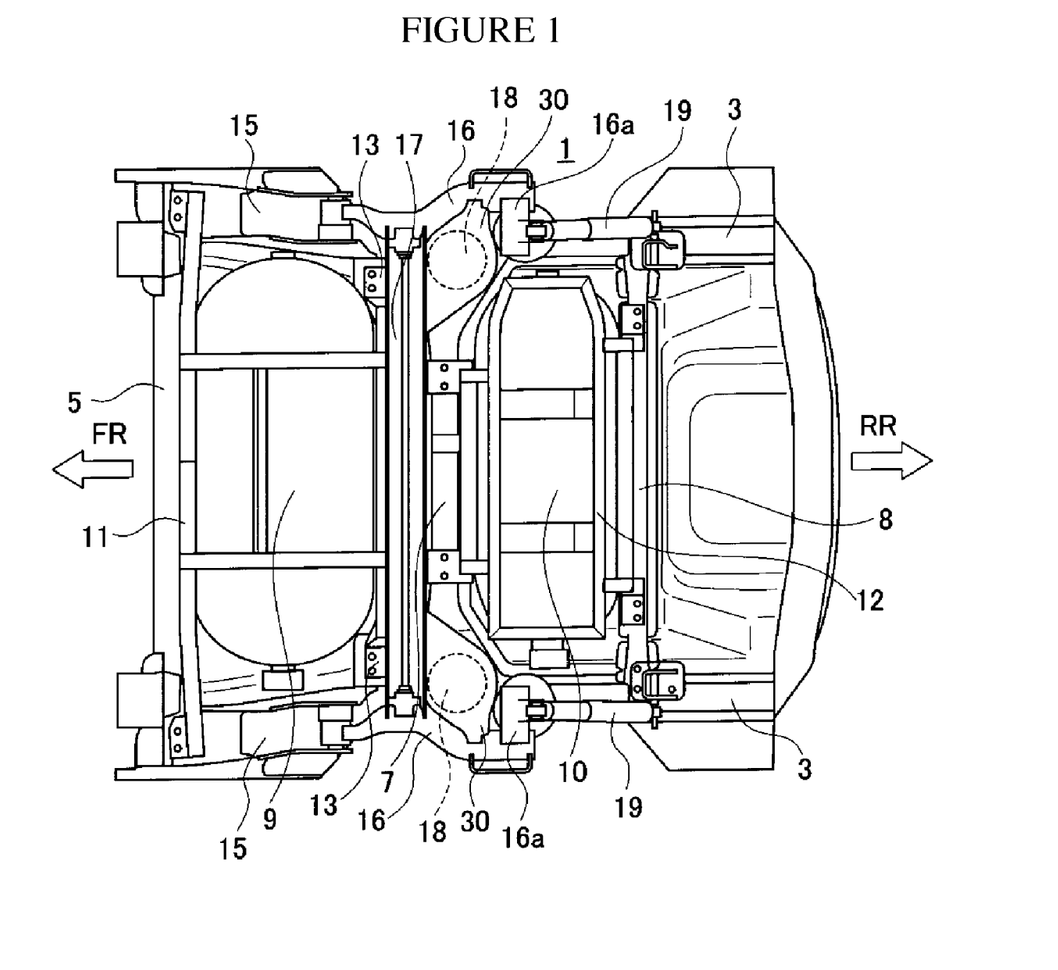
FIG. 1 is a bottom view illustrating the tank-carrying vehicle rear body structure in a first embodiment of the invention.
Figure 2:
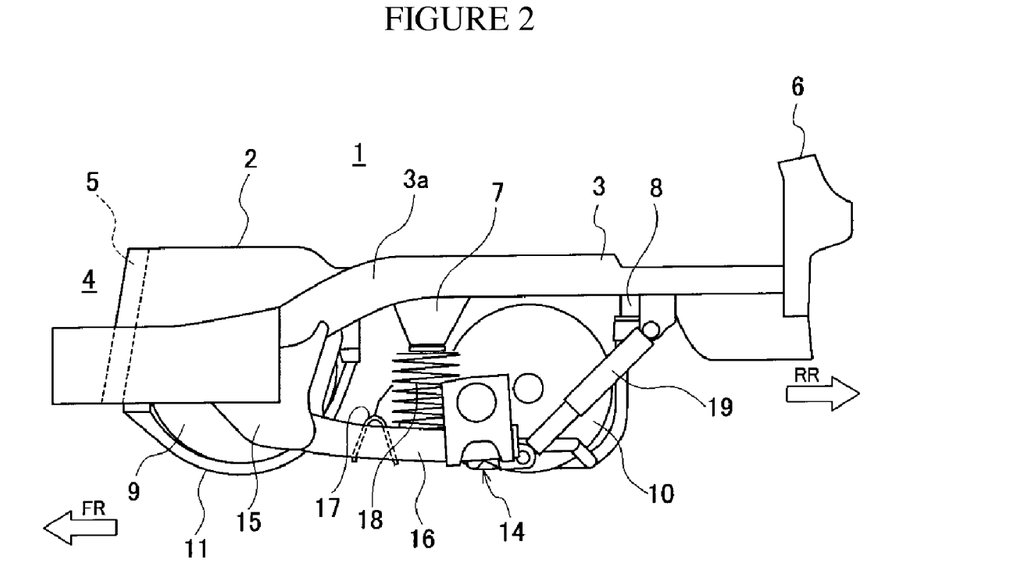
FIG. 2 is a side view illustrating the tank-carrying vehicle rear body structure in the first embodiment.

A first embodiment of the invention is described with reference to FIGS. 1-6. In FIGS. 1 and 2, arrow FR indicates the front of the vehicle, and arrow RR indicates the rear of the vehicle. In FIG. 2, as in other side view figures hereinafter described and shown, the side not shown in symmetrical to the side view shown. Accordingly, while a description is generally made with respect to components on one side, and in particularly to effects of collision on the components on one side, similar effects occur on the opposite side.

Rear body structure 1 comprises rear floor panel 2 made of a metal panel or the like to form the floor portion of the vehicle cab, and rear panel 6 arranged extending in the vehicle lateral direction at the rear end portion of the vehicle. On the other hand, the vehicle body frame portion mainly comprises a pair of rear side members 3 arranged extending rearward in the vehicle longitudinal direction from front floor part 4 and arranged on the left and right sides in the vehicle lateral direction, respectively, seat cross member 5 joined to the front end portions of the left and right rear side members 3 and extending in the vehicle lateral direction, front-side cross member 7 arranged at a prescribed distance rearward of the seat cross member 5, and rear-side cross member 8 arranged at a predetermined distance rearward of the front-side cross member 7.

Each rear side member 3 is arranged inclined with an upward gradient toward the rear upper side of the vehicle in the side view shown in FIG. 2 from front floor part 4 toward a kick-up portion 3a, and its rear portion becomes nearly horizontal from the kick-up portion 3a to the rear of the vehicle. The rear side member 3 forms a vehicle frame member with a nearly U-shaped cross section with the upper side open with respect to the vehicle body.

The seat cross member 5 is located at and joins the front end portion of left and right rear side members 3.

The front-side cross member 7 is located at the rear of the kick-up portion 3a with respect to the vehicle, extends in the vehicle lateral direction between left and right rear side members 3, and is coupled to the left and right rear side members 3. Just like the rear side member 3, the front-side cross member 7 forms a vehicle frame member with a U-shaped cross section opening on the upper side with respect to the vehicle body.

The rear-side cross member 8 is located rearward of the front-side cross member 7 with respect to the vehicle body, extends in the vehicle lateral direction between left and right rear side members 3, and is coupled to the left and right rear side members 3. Just like the front-side cross member 7, the rear-side cross member 8 also forms a vehicle frame member with a nearly U-shaped cross section opening on the upper side with respect to the vehicle body.

On the rear side members 3, rear suspension 14 that suspends the rear wheels on the vehicle body is attached. The rear suspension 14 is a so-called torsion beam type suspension and comprises trailing arm 16, torsion beam 17, suspension spring 18 and shock absorber 19.

The front end portion of the trailing arm 16 is supported using a fastening method that allows the latter to rotate freely around the axial center in the vehicle lateral direction with respect to a trailing arm bracket 15. Trailing arm bracket 15 is joined and fastened on the rear side members 3 forward of the kick-up portions 3a.

The torsion beam 17 extends in the vehicle lateral direction between and is coupled to the left and right trailing arms 16. Here, torsion beam 17 acts to control the behavior or rolling of the vehicle, and torsion beam 17 can be formed with any of various cross sectional shapes. For example, torsion beam 17 may have a nearly V-shaped cross section that opens to the lower side of the vehicle as shown in FIGS. 2-18 and 20-23.

The suspension spring 18 extends in the vertical direction of the vehicle, with a vehicle body side attachment point coupled to the front-side cross member 7 and with a rear suspension side attachment point formed as a dish-shaped base 30. The dish-shaped base 30 is arranged rearward of the torsion beam 17 with respect to the vehicle body and is coupled to the trailing arm 16 and the torsion beam 17. The suspension spring 18 is a cylindrical-shaped spring for damping vibration of the vehicle.

The shock absorber 19 is coupled at a first end to the rear-side cross member 8 and is coupled at a second end to a rear end portion 16a of trailing arm 16.

In the rear body structure comprised of the frame members, the gas tank is carried on the tank frame and coupled to the lower portion of the vehicle body. In this embodiment, the gas tank consists of two tanks, front-side gas tank 9 and rear-side gas tank 10, arranged in tandem in the longitudinal direction of the vehicle with rear suspension 14 sandwiched substantially between them. For example, for an automobile powered by a fuel cell unit, the gas tank 9, 10 can be a hydrogen gas tank filled with hydrogen gas.

The front-side gas tank 9 and rear-side gas tank 10 have a structure known as a liner structure prepared by winding several layers of carbon fibers on a metal vessel consisting of a cylindrical aluminum vessel or the like with the two end portions formed in a dome shape. Consequently, the front-side gas tank 9 and rear-side gas tank 10 have higher strength than that of the vehicle body members made of metal.

The front-side gas tank 9 is accommodated in the space defined by seat cross member 5, front-side cross member 7 and left and right rear side members 3, and its longitudinal direction extends in the vehicle lateral direction. The front-side gas tank 9 is coupled to the lower portion of the vehicle body via front-side tank frame 11 formed as a frame member having a closed polygonal cross section. The vehicle front-side attachment point of the front-side tank frame 11 is coupled to the lower surface of the front end portion of rear side member 3, and the vehicle rear-side attachment point of the front-side tank frame 11 is coupled to tank attachment bracket 13. The tank attachment bracket 13 is located forward of kick-up portion 3a with respect to the vehicle and is joined to rear side member 3 and rear floor panel 2.

Similarly, rear-side gas tank 10 is accommodated in the space defined by front-side cross member 7, rear-side cross member 8 and left and right rear side members 3, and its longitudinal direction extends in the vehicle lateral direction. The rear-side gas tank 10 is coupled to the lower portion of the vehicle body via rear-side tank frame 12 formed as a frame member having a closed polygonal cross section. The vehicle front side attachment point of the rear-side tank frame 12 is coupled to the lower surface of front-side cross member 7, and the vehicle rear-side attachment point of the rear-side tank frame 12 is fastened to the lower surface of rear-side cross member 8. As a result, the vehicle front side attachment point of the rear-side tank frame 12 is near the kick-up portions 3a of rear side members 3.

Various methods may be adopted for the coupling of each of the front-side tank frame 11 and rear-side tank frame 12, which respectively support the front-side gas tank 9 and rear-side gas tank 10 on the vehicle body. As an example, one may adopt a fastening method using bolts and nuts.

The relative positions of rear-side gas tank 10 and torsion beam 17 are such that torsion beam 17 is located at the front lower side of rear-side gas tank 10 and rear-side tank frame 12 with respect to the vehicle body. Additionally, upper end portion 17a of torsion beam 17 and rear-side gas tank 10 are arranged such that center of gravity position G of rear-side gas tank 10 in the vertical direction of the vehicle is higher than torsion beam 17. As explained above, torsion beam 17 forms a portion of the suspension, and it moves up/down as the vehicle runs. Consequently, it is arranged such that, even when it rises to its top position, center of gravity position G of rear-side gas tank 10 is still located above torsion beam 17. That is, even when rear suspension 14 bounds/rebounds, center of gravity position G of rear-side gas tank 10 and torsion beam 17 can still hold their relative position relationship.

In the following, an explanation is given regarding distribution of strength of rear side member 3. As explained above, front-side gas tank 9 and rear-side gas tank 10 have sufficiently high strength to withstand high pressure gas filled in the tanks. Consequently, they also have higher strength than the crushing and flexural strength of the vehicle body frame. In addition, for fastening the front-side gas tank 9 and rear-side gas tank 10 on the vehicle body, the strength of the front-side tank frame 11 and rear-side tank frame 12 should be high enough to support front-side gas tank 9 and rear-side gas tank 10, both of which are heavy parts. Consequently, front-side tank frame 11 and rear-side tank frame 12 also have higher strength than the crushing and flexural strength of the vehicle body frame.

The rear side members 3 include various portions having varying strength. First is the forward portion defined beginning from the tank attachment bracket 13 of the front-side tank frame 11 to forward of the kick-up portion 3a. This forward portion is formed having a relatively high strength. Second is the kick-up portion 3a, which is formed having a relatively weak strength. Third is the middle portion defined between front-side cross member 7 and rear-side cross member 8, where the front fastening point of rear-side tank frame 12 is attached. This middle portion is formed having a relatively high strength. Fourth is the rearward portion 3b, beginning from the rear-side cross member 8 and extending rearward, which is formed having a relatively weak strength.

For this embodiment, when input load F is applied toward the front of the vehicle at the rear end portion 3b of the rear side members 3 and the rearward portion of rear-side tank frame 12, each rear side member 3 is folded to a nearly V-shape toward the front side of the vehicle from kick-up portion 3a acting as a bending portion, and, at the same time, front-side gas tank 9 and the front-side tank frame 11 are pushed along with rear side member 3 upward with respect to the vehicle body by a member-folding-facilitating part.

In the first embodiment, the member-folding-facilitating part consists of torsion beam 17 that forms torsion beam type rear suspension 14 arranged ahead of rear-side gas tank 10 with respect to the vehicle body. Here, under the input load F, rear-side gas tank 10 and rear-side tank frame 12 collide with torsion beam 17 at a position ahead of rear-side gas tank 10 and rear side tank frame 12 with respect to the vehicle body. As a result, rear-side gas tank 10 and rear-side tank frame 12 are pushed toward the front upper side of the vehicle along with rear side member 3. This member-folding-facilitating part will be elaborated upon in a later explanation on the crushing operation of the rear portion of the vehicle body.

Figure 3:
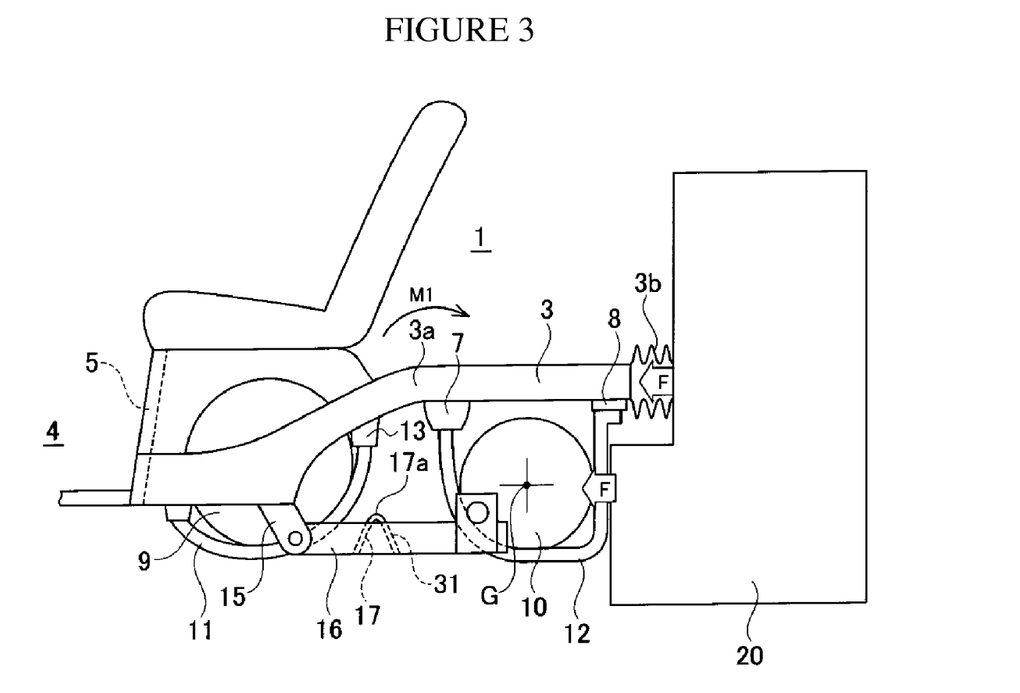
FIG. 3 is a diagram illustrating the initial crushing stage among a series of operational diagrams of the crushing operation of a rear portion of a vehicle body incorporating the tank-carrying vehicle rear body structure in the first embodiment.

For example, as shown in FIG. 3, when rear colliding object 20 behind the rear side of the vehicle collides with the vehicle toward the front of the vehicle, input load F is input toward the front of the vehicle on rear end portion 3b of the left and right rear side members 3 and the rear end portion of rear-side tank frame 12. The vehicle rear body structure is such that, under the input load F, the rear portion 3b of rear side member 3 and the portion behind the vehicle body rear-side attachment point of rear-side tank frame 12 are axially crushed and deformed toward the front of the vehicle.

Figure 4:
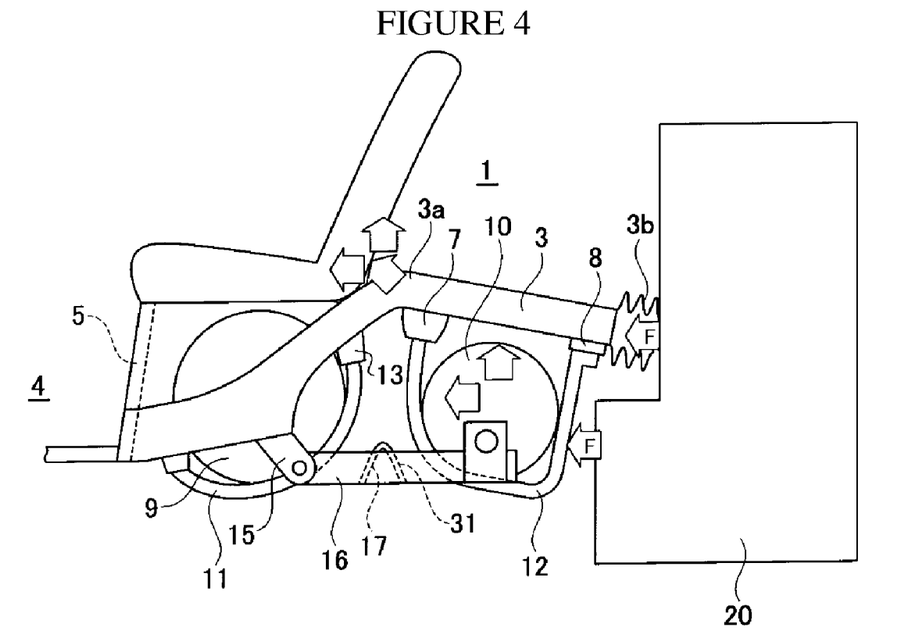
FIG. 4 is a diagram illustrating a former intermediate crushing stage among a series of operational diagrams of the crushing operation of the rear portion of the vehicle body incorporating the tank-carrying vehicle rear body structure in the first embodiment.

Here, rear-side tank frame 12 extends to a position lower than the rear portion of kick-up portion 3a of rear side member 3, and, at the same time, the rear end portion of rear-side tank frame 12 is secured on the rear portion of rear side member 3. While input load F of rear colliding object 20 is input to rear-side tank frame 12 toward the front of the vehicle, as shown in FIG. 3, moment M1 is generated clockwise around kick-up portion 3a. As a result, the rear portions of the left and right rear side members 3 are folded to a nearly V-shape with deformation upward at the kick-up portion 3a as shown in FIG. 4.

In this case, rear-side gas tank 10 and rear-side tank frame 12 arranged between front-side cross member 7 and rear-side cross member 8 have high rigidity, so they are not crushed under input load F. Instead, rear side members 3 are bent to a nearly V-shape, with deformation made toward the front of the vehicle.

Figure 5:
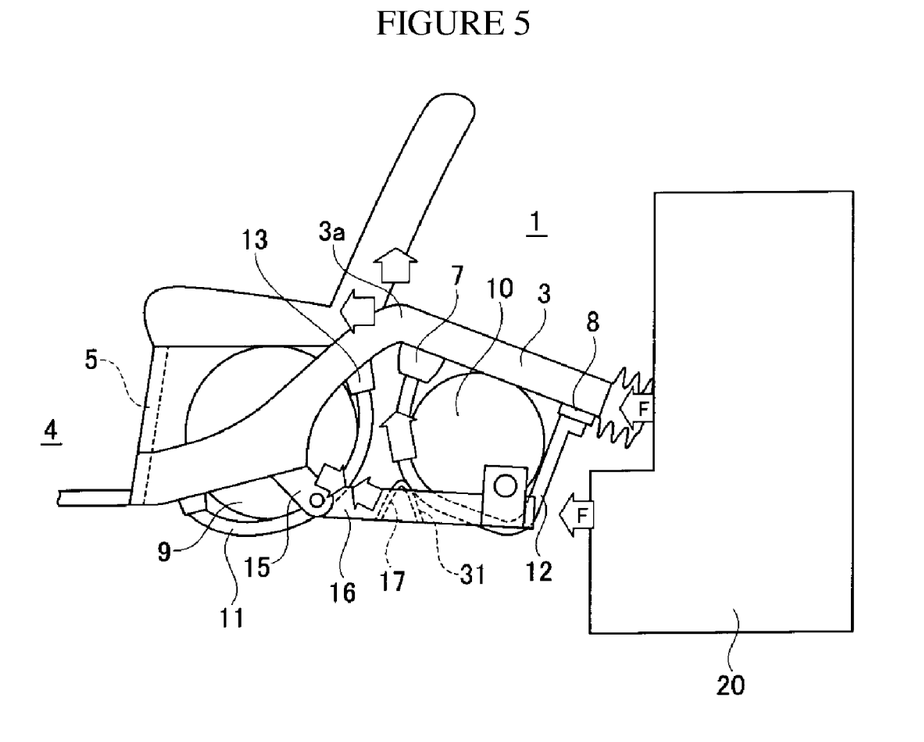
FIG. 5 is a diagram illustrating a later intermediate crushing stage among a series of operational diagrams of the crushing operation of the rear portion of the vehicle body incorporating the tank-carrying vehicle rear body structure in the first embodiment.

As deformation further progresses, as shown in FIG. 5, rear-side gas tank 10 and rear-side tank frame 12 collide with slope 31 of torsion beam 17 toward the rear side of the vehicle. In this case, because both trailing arm 16 and trailing arm bracket 15 are stronger than the other vehicle body members, a reactive force is generated toward the rear side of the vehicle. As a result, depending on the relationship between the angle of the plane of the torsion beam 17 and the angle of the rear-side tank frame 12, the front portions of rear-side gas tank 10 and rear-side tank frame 12 are deformed upward with respect to the vehicle body.

Among the forces acting on slope 31 formed on the rear side of the torsion beam 17, the fractional force in the direction along slope 31 becomes the force acting toward the upper side of the vehicle. This force toward the upper side of the vehicle becomes an upward load near kick-up portion 3a of rear side member 3 from the vehicle front side attachment point of rear-side tank frame 12. Consequently, the load is propagated through rear-side tank frame 12, and a load toward the upper side of the vehicle is input to front-side cross member 7. Consequently, kick-up portion 3a of rear side member 3 coupled to the front-side cross member 7 is deformed upward with respect to the vehicle body. At the same time, a tensile force is applied on the rear end portion of rear-side tank frame 12 such that the rear end portion of rear side member 3 is deformed downward with respect to the vehicle body. As a result, each rear side member 3 is folded to a nearly V-shape.

Figure 6:
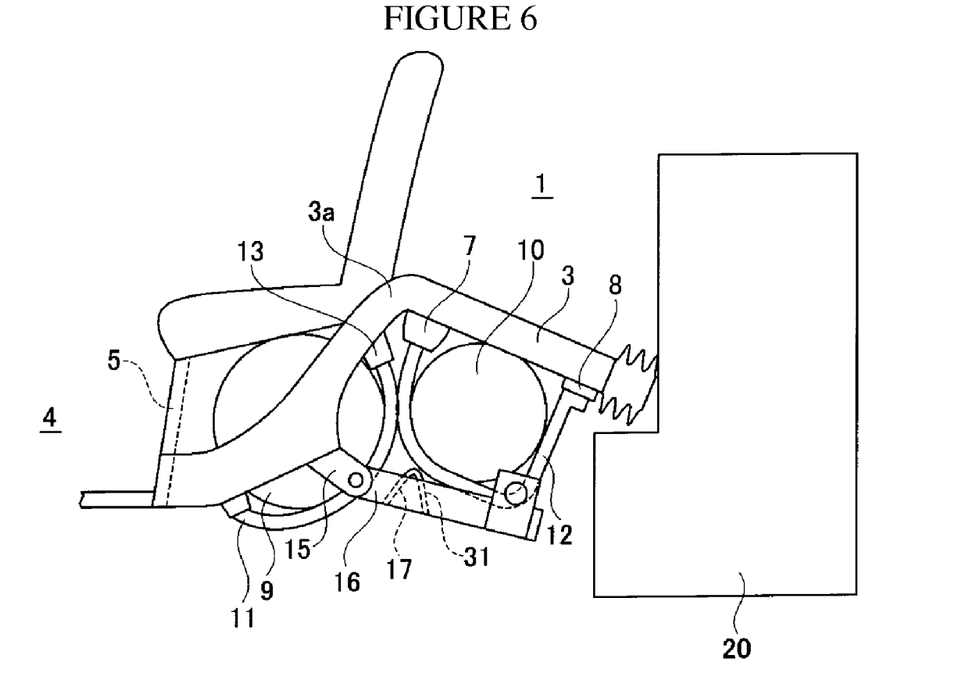
FIG. 6 is a diagram illustrating a later crushing stage among a series of operational diagrams of the crushing operation of the rear portion of the vehicle body incorporating the tank-carrying vehicle rear body structure in the first embodiment.

From this state, deformation further progresses, and, as shown in FIG. 6, rear-side gas tank 10 and rear-side tank frame 12 are displaced forward with respect to the vehicle body to interfere with the rear side of front-side gas tank 9 and front-side tank frame 11. As a result, front-side gas tank 9 and front-side tank frame 11 start displacement toward the front of the vehicle, and they interfere with the rear side of seat cross member 5, and the input load is transmitted via seat cross member 5 to side members arranged below the floor of the vehicle (not shown in the figure).

In this way, for the tank-carrying vehicle rear body structure of the first embodiment, when rear colliding object 20 impacts, torsion beam 17 is arranged for pushing the vehicle front side attachment point of rear-side tank frame 12 upward with respect to the vehicle body to facilitate transmission of the upward load as the load for folding rear side member 3 to a nearly V-shape. As a result, the amount of bending of rear side member 3 to the nearly V-shape is increased, and the amount of absorption of the collision energy can be increased. Consequently, the use of a reinforcement member or the like as a collision energy absorbing member is not required, so the weight and cost of a vehicle can be reduced.

In the first embodiment, kick-up portion 3a as the bending portion of each rear side member 3 is a weak portion with a rigidity lower than the other parts, and, when an input load is applied to the rear end portion of the rear side members 3 toward the front of the vehicle, each rear side member 3 is folded to a V-shape toward the front of the vehicle from kick-up portion 3a. Also, a member-folding-facilitating part is arranged such that it is pushed toward the front upper side of the vehicle along with rear side member 3. Consequently, the energy can be absorbed by the entirety of the rear portion of the vehicle, so that its resistance to collision damage can be improved.

Also, according to the first embodiment, torsion beam 17 is included as part of a rear suspension 14 and is also used as the member-folding-facilitating part. Consequently, a torsion beam 17 conventionally included with existing rear body structures can be used, instead of adding a dedicated member, so an increase in cost can be limited.

Also, in the first embodiment, because the rigidity of the gas tank and tank frame is higher than that of rear side member 3, the rear side member 3 can be folded to a V-shape more easily, so the amount of energy absorbed can be increased.

In the first embodiment, under input load F, rear-side gas tank 10 and rear-side tank frame 12 collide with front-side gas tank 9 and front-side tank frame 11, so that folding of the front end portion of rear side member 3 is facilitated, and the amount of collision energy absorbed can thus be increased.

FIGS. 7-10 show a series of operational diagrams illustrating the crushing operation of a rear portion of a vehicle body incorporating a tank-carrying vehicle rear body structure in a second embodiment of the invention.

The tank-carrying vehicle rear body structure in the second embodiment is similar to that in the first embodiment. However, different from the first embodiment, the second embodiment includes a member-folding-facilitating auxiliary part for further facilitating folding of rear side member 3.

Figure 7:
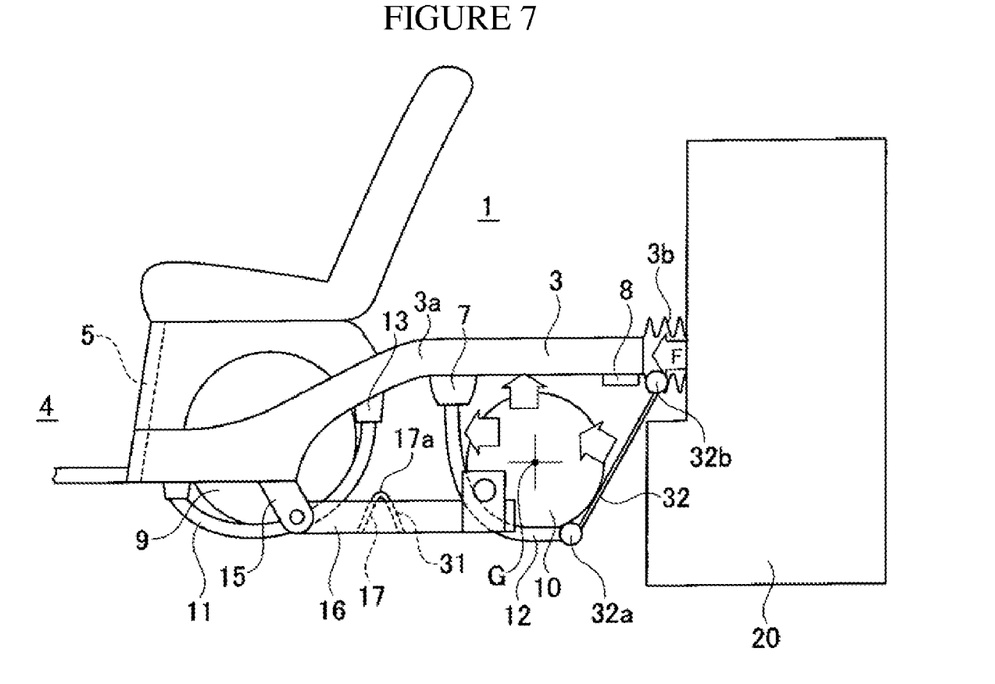
FIG. 7 is a diagram illustrating the initial crushing stage among a series of operational diagrams of the crushing operation of a rear portion of a vehicle body incorporating a tank-carrying vehicle rear body structure in a second embodiment of the invention.

The member-folding-facilitating auxiliary part consists of connecting member 32. The connecting member 32 is plate-shaped and has a first end 32a coupled to the vehicle rear-side attachment point of rear-side tank frame 12 and a second end 32b coupled to the rear end portion 3b of the rear side member so that the connecting member 32 is arranged inclined from the front lower side of the rear body structure toward the upper rear of the rear body structure. The first end 32a of the connecting member 32 coupled to the vehicle front side attachment point of rear-side tank frame 12 is located at a position lower than the center of gravity position G of the rear-side gas tank 10. It is preferred but not necessary that the inclination angle of connecting member 32 with respect to the upper shaft of the vehicle be about 45°.

Figure 8:
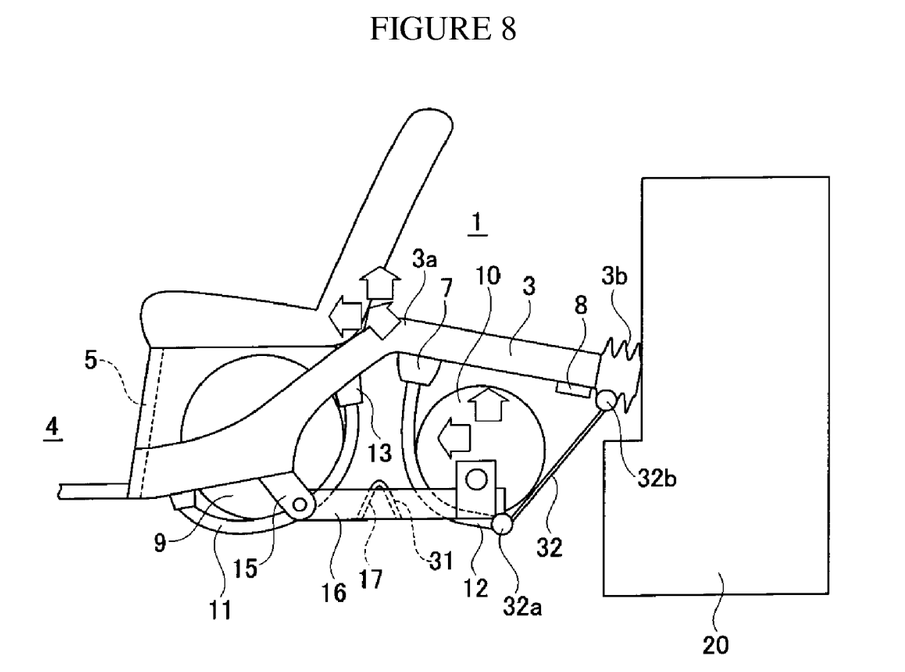
FIG. 8 is a diagram illustrating a former intermediate crushing stage among a series of operational diagrams of the crushing operation of the rear portion of the vehicle body incorporating the tank-carrying vehicle rear body structure in the second embodiment.

In an initial crushing stage shown in FIG. 7, the force due to the input load F works on connecting member 32 along its slope, that is, at an angle of about 45° with respect to the rear side members 3. The force acting on connecting member 32 is input to rear side members 3 at that moment around the vehicle rear-side attachment point of rear-side tank frame 12 (first end 32a of connecting member 32) as the rotating center. Consequently, as shown in FIG. 8, each rear side member 3 is folded from kick-up portion 3a. At the same time, by the moment about first end 32a, rear-side gas tank 10 and rear-side tank frame 12 are displaced along with rear side members 3 toward the upper side of the vehicle.

Figure 9:
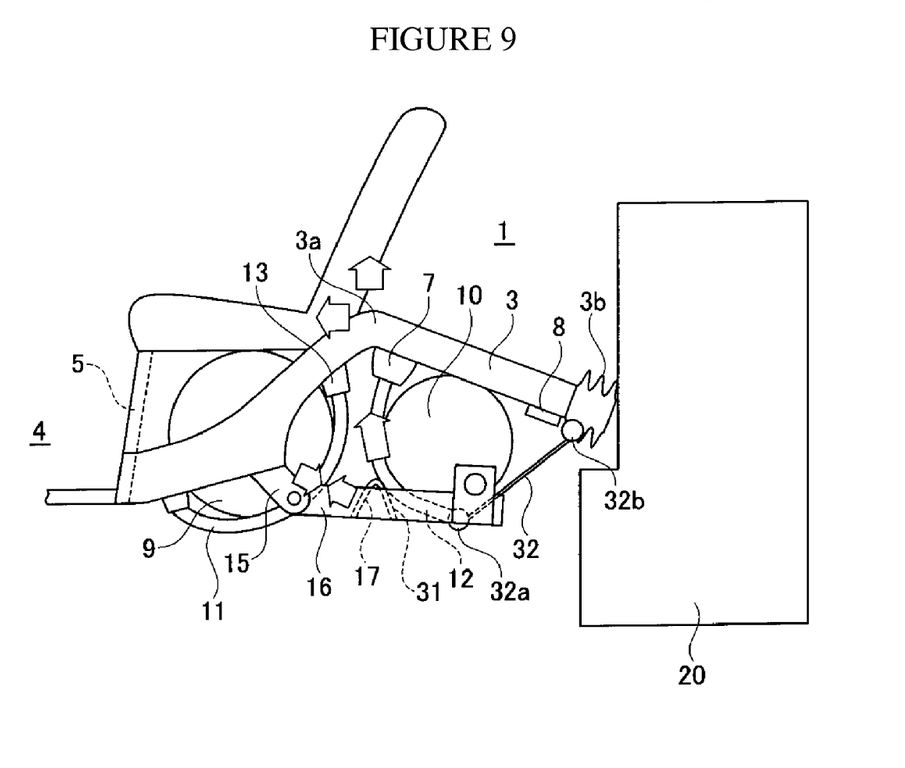
FIG. 9 is a diagram illustrating a later intermediate crushing stage among a series of operational diagrams of the crushing operation of the rear portion of the vehicle body incorporating the tank-carrying vehicle rear body structure in the second embodiment.
Figure 10:
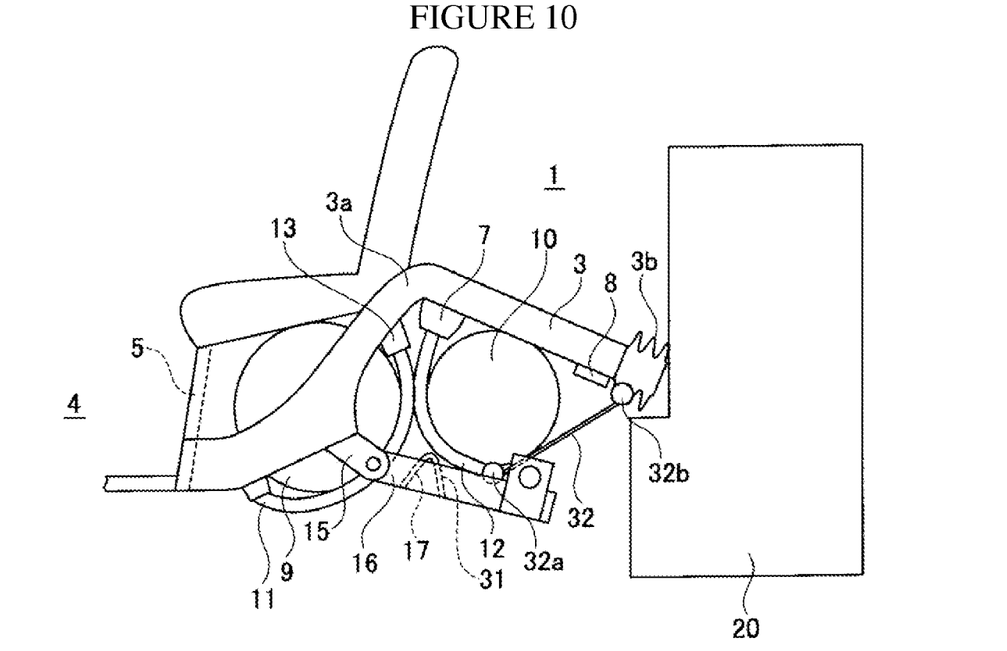
FIG. 10 is a diagram illustrating a later crushing stage among a series of operational diagrams of the crushing operation of the rear portion of the vehicle body incorporating the tank-carrying vehicle rear body structure in the second embodiment.

Then, as shown in FIG. 9, rear-side gas tank 10 and rear-side tank frame 12 collide with torsion beam 17, and, along with rear side members 3, they are further folded toward the upper side of the vehicle. Finally, as shown in FIG. 10, rear-side gas tank 10 and rear-side tank frame 12 contact the front-side gas tank 9 and front-side tank frame 11.

In the second embodiment, by means of connecting member 32 as a member-folding-facilitating auxiliary part, rear-side gas tank 10 and rear-side tank frame 12 can be pushed upward with respect to the vehicle body. Also, in the second embodiment, because connecting member 32 is arranged in a portion of maximum space, the larger space can be effectively used, and, at the same time, folding of each rear side member 3 is facilitated so that the amount of collision energy absorbed can be increased.

FIGS. 11-14 show a series of operational diagrams illustrating the crushing operation of a rear portion of a vehicle body incorporating a tank-carrying vehicle rear body structure in a third embodiment of the invention.

The tank-carrying vehicle rear body structure in the third embodiment is similar to that in the first embodiment. However, different from the first embodiment, the third embodiment includes a member-folding-facilitating auxiliary part for further facilitating folding of rear side members 3.

Figure 11:
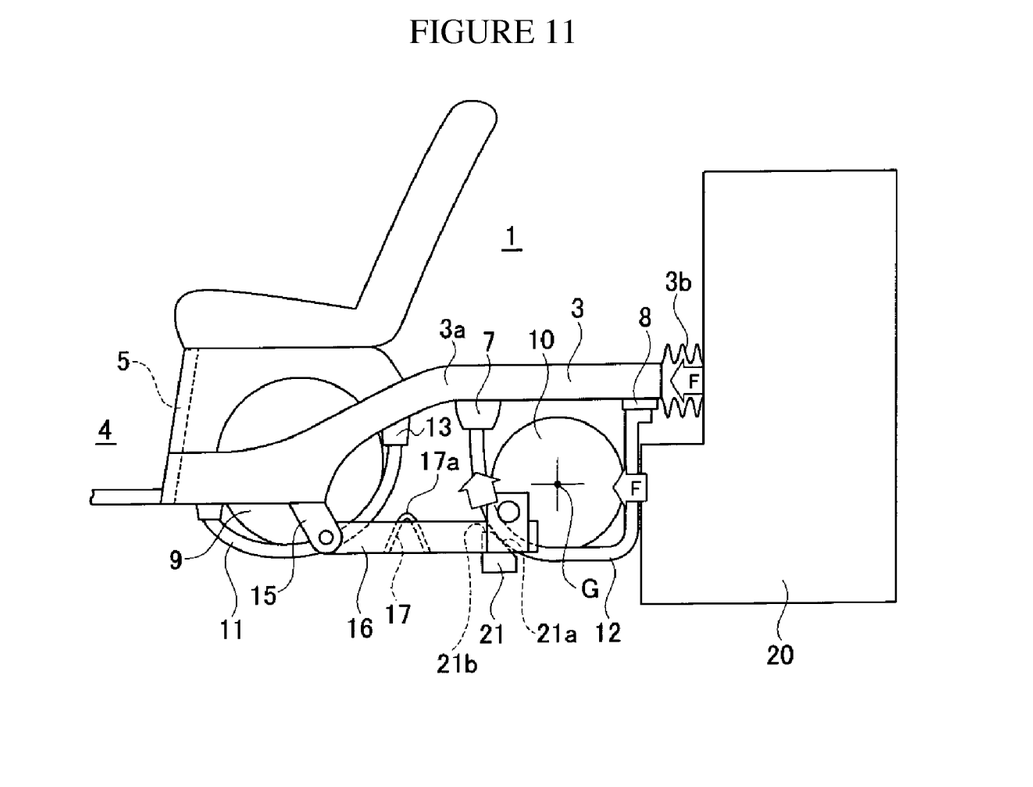
FIG. 11 is a diagram illustrating the initial crushing stage among a series of operational diagrams of the crushing operation of a rear portion of a vehicle body incorporating a tank-carrying vehicle rear body structure in a third embodiment of the invention.

The member-folding-facilitating auxiliary part consists of driving mechanism part 21, which has slope 21a, with which rear-side gas tank 10 and rear-side tank frame 12 collide under input load F on the rear side of the vehicle and are guided toward the front upper side of the vehicle. The driving mechanism part 21 is arranged between torsion beam 17 and rear-side gas tank 10, and it is located at a position lower than the center of gravity position G of rear-side gas tank 10.

The driving mechanism part 21 acts to drive the rear wheels (not shown) of the vehicle. It may adopt any of various forms. As an example, it may consist of a differential box connected in the longitudinal direction by the transmission and the drive shaft, or a driving motor unit, etc. In this embodiment, a driving motor unit is used as the driving mechanism part 21.

The driving mechanism part 21 is formed as a portion of a suspension member, and it is mounted on the suspension member or the like to extend in the lateral direction (that is, side-to-side) with respect to the vehicle. Also, upper end portion 21b of driving mechanism part 21 is at a lower position in the vertical direction than the center of gravity position G of rear-side gas tank 10. Also, the upper end portion 17a of torsion beam 17 is at a higher position than the upper end portion 21b of driving mechanism part 21.

Figure 12:
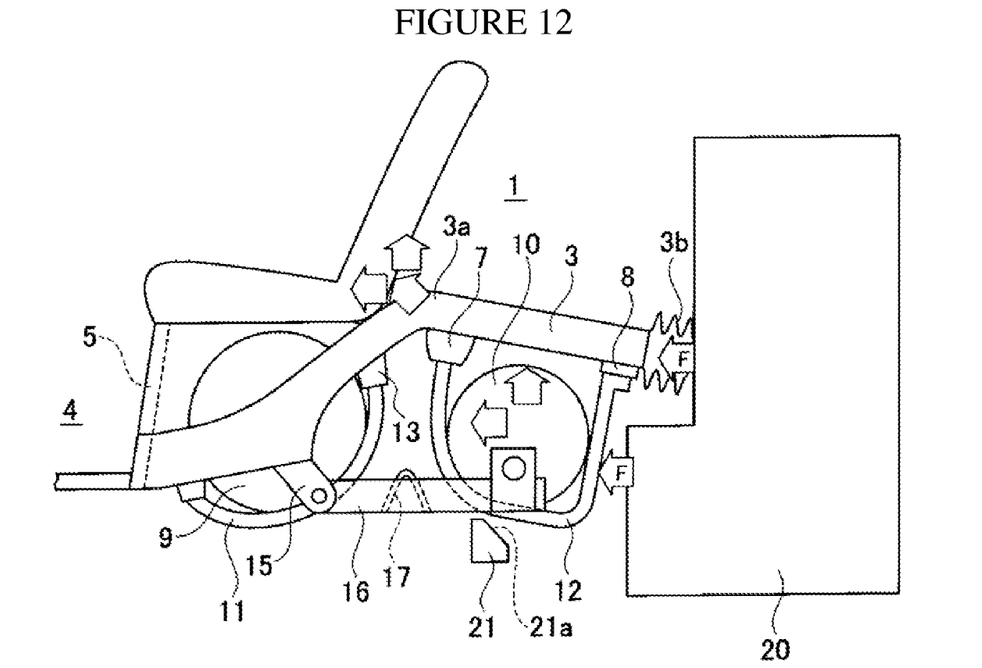
FIG. 12 is a diagram illustrating a former intermediate crushing stage among a series of operational diagrams of the crushing operation of the rear portion of the vehicle body incorporating the tank-carrying vehicle rear body structure in the third embodiment.

For the tank-carrying vehicle rear body structure in the third embodiment, in the initial crushing stage shown in FIG. 11, rear-side gas tank 10 or rear-side tank frame 12 collides with slope 21a of driving mechanism part 21, and, along with rear side member 3 folded from kick-up portion 3a, rear-side gas tank 10 and rear-side tank frame 12 are pushed toward the front upper side of the vehicle as shown in FIG. 12. When rear-side gas tank 10 and rear-side tank frame 12 collide with the driving mechanism part 21, a load for folding each rear side member 3 to a nearly V-shape can be generated. As a result, folding of rear side members 3 can be further facilitated.

Figure 13:
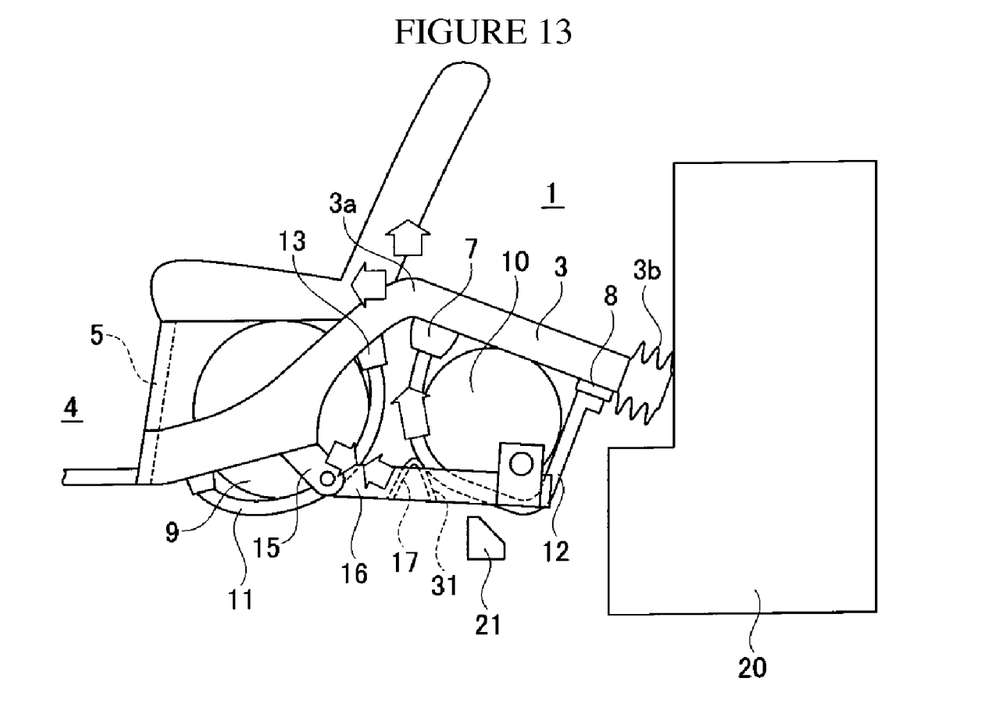
FIG. 13 is a diagram illustrating a later intermediate crushing stage among a series of operational diagrams of the crushing operation of the rear portion of the vehicle body incorporating the tank-carrying vehicle rear body structure in the third embodiment.

Then, as shown in FIG. 13, rear-side gas tank 10 and rear-side tank frame 12 collide with torsion beam 17 and are pushed further upward with respect to the vehicle body.

Figure 14:
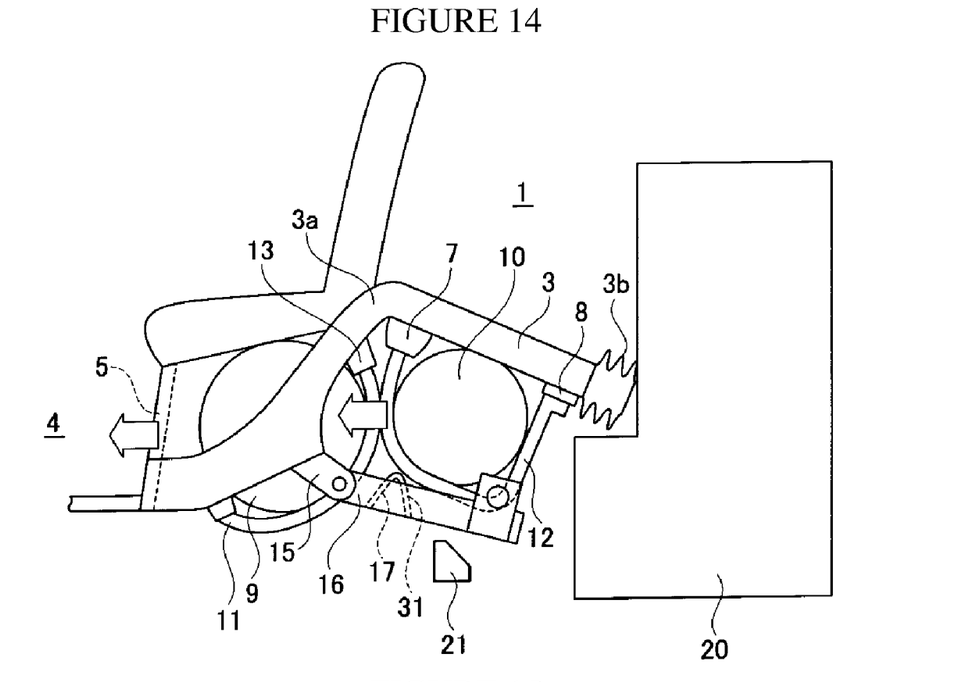
FIG. 14 is a diagram illustrating a later crushing stage among a series of operational diagrams of the crushing operation of the rear portion of the vehicle body incorporating the tank-carrying vehicle rear body structure in the third embodiment.

Finally, as shown in FIG. 14, rear-side gas tank 10 and rear-side tank frame 12 contact front-side gas tank 9 and front-side tank frame 11.

According to the third embodiment, rear-side gas tank 10 and rear-side tank frame 12 collide with driving mechanism part 21 as a member-folding-facilitating auxiliary part, and they are pushed toward the front upper side of the vehicle. In addition, in the third embodiment, the position of torsion beam 17 is not moved from the original position, and existing driving mechanism part 21 is arranged between torsion beam 17 and rear-side gas tank 10. Without using a dedicated member, driving mechanism part 21 can be used to facilitate folding of rear side member 3 so that the amount of collision energy absorbed can be further increased.

In addition, in the third embodiment, because torsion beam 17 is arranged at a position higher than driving mechanism part 21 with respect to the vehicle body, after rear-side gas tank 10 and rear-side tank frame 12 are pushed toward the front upper side of the vehicle by driving mechanism part 21, they can again be guided by torsion beam 17 and are further pushed toward the front upper side of the vehicle.

FIGS. 15-18 show a series of operational diagrams illustrating the crushing operation of a rear portion of a vehicle body incorporating a tank-carrying vehicle rear body structure in a fourth embodiment of the invention.

The tank-carrying vehicle rear body structure in the fourth embodiment is similar to that in the first embodiment. However, the fourth embodiment is different in that the vehicle rear-side attachment point where front-side tank frame 11 of front-side gas tank 9 is attached on the vehicle body and the vehicle front side attachment point where rear-side tank frame 12 of rear-side gas tank 10 is attached on the vehicle body share a common attachment point, and the common attachment point is arranged on kick-up portion 3a.

Figure 15:
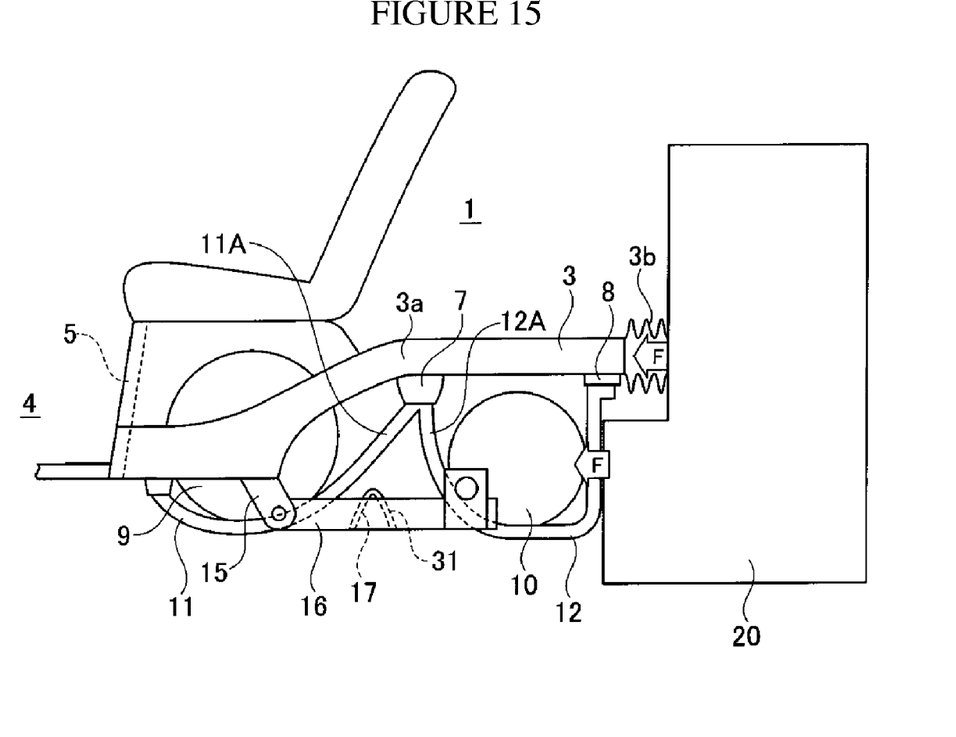
FIG. 15 is a diagram illustrating the initial crushing stage among a series of operational diagrams of the crushing operation of a rear portion of a vehicle body incorporating a tank-carrying vehicle rear body structure in a fourth embodiment of the invention.

More specifically, as shown in FIG. 15, the vehicle rear supporting portion of front-side tank frame 11 and the front supporting portion of rear-side tank frame 12 are attached at the same position in the longitudinal direction of the vehicle on front-side cross member 7 near kick-up portion 3a where rear side member 3 folds. In addition, by means of notches, etc., a low-rigidity portion is arranged in front-side cross member 7 such that, in case of a rear collision, the front-side cross member 7 is twisted with the common attachment portion as the rotating axis.

Figure 16:
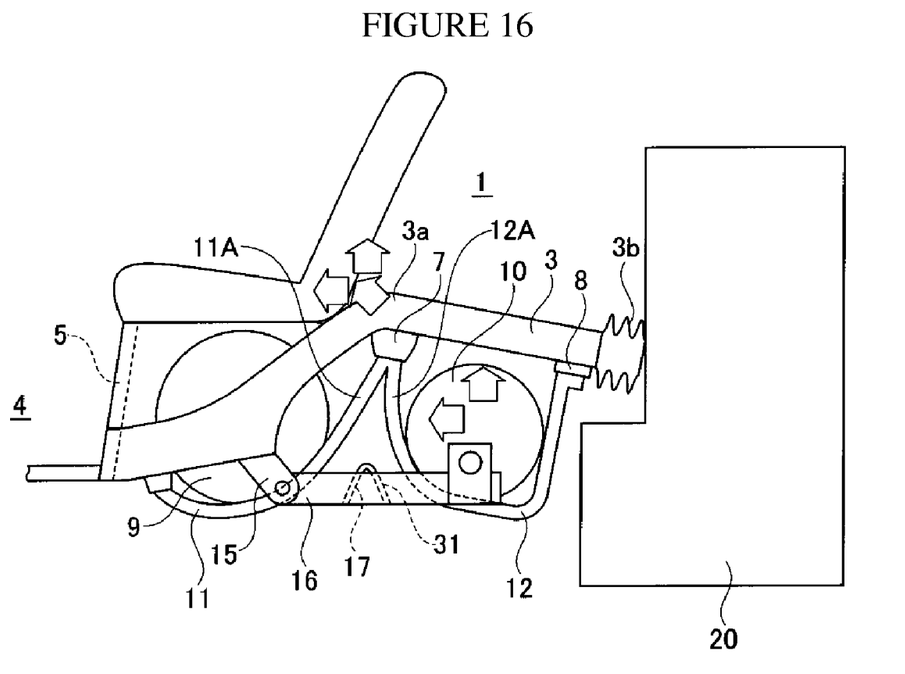
FIG. 16 is a diagram illustrating a former intermediate crushing stage among a series of operational diagrams of the crushing operation of the rear portion of the vehicle body incorporating the tank-carrying vehicle rear body structure in the fourth embodiment.
Figure 17:
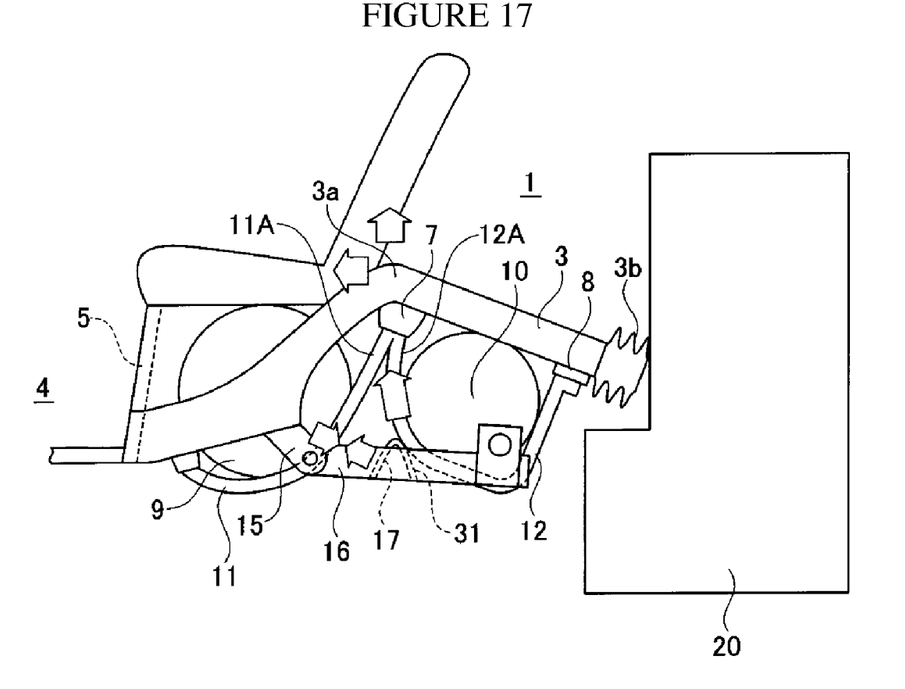
FIG. 17 is a diagram illustrating a later intermediate crushing stage among a series of operational diagrams of the crushing operation of the rear portion of the vehicle body incorporating the tank-carrying vehicle rear body structure in the fourth embodiment.
Figure 18:
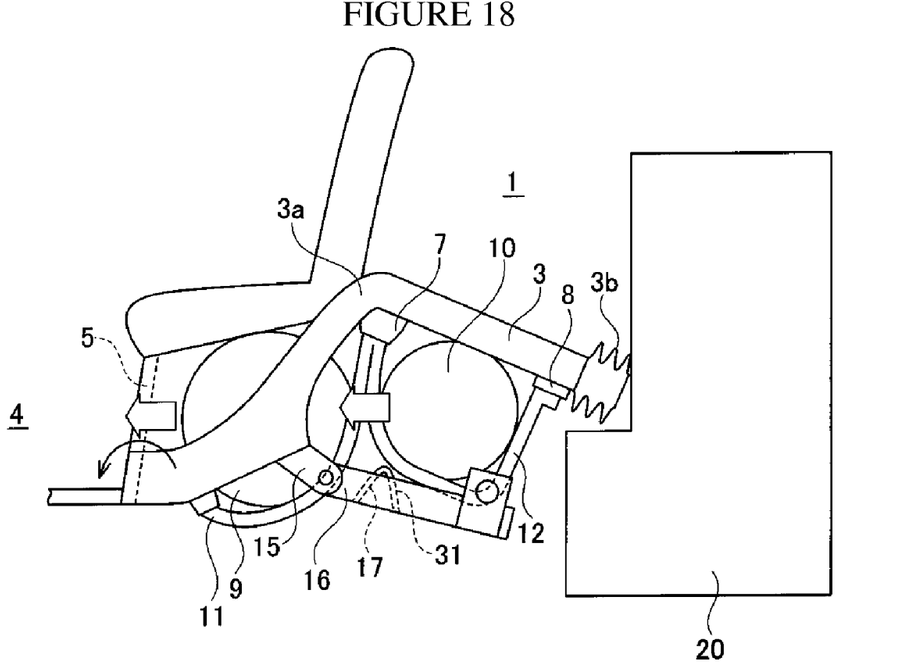
FIG. 18 is a diagram illustrating a later crushing stage among a series of operational diagrams of the crushing operation of the rear portion of the vehicle body incorporating the tank-carrying vehicle rear body structure in the fourth embodiment.

In the tank-carrying vehicle rear body structure in the fourth embodiment, the load acting on rear-side tank frame 12 by input load F from behind the vehicle acts on front-side cross member 7 as the common attachment point as shown in FIGS. 15 and 16 so that the front-side cross member 7 is twisted, and each rear side member 3 is folded to a nearly V-shape around kick-up portion 3a. Then, as shown in FIG. 17, rear-side gas tank 10 and rear-side tank frame 12 collide with torsion beam 17, so that along with rear side member 3, they are folded and pushed upward with respect to the vehicle body. Finally, as shown in FIG. 18, rear-side gas tank 10 and rear-side tank frame 12 contact front-side gas tank 9 and front-side tank frame 11.

In the fourth embodiment, each rear side member 3 is folded around the common attachment point of front-side tank frame 11 and rear-side tank frame 12 as the rotating axis. Consequently, a counter-moment does not occur, and rear side members 3 can be folded with respect to kick-up portions 3a with a smaller force.

In the fourth embodiment, the rear supporting portion of front-side tank frame 11 and the front supporting portion of rear-side tank frame 12 use a common attachment point, so the space required in the longitudinal direction of the vehicle for carrying the tanks is minimized. At the same time, folding of rear side members 3 is facilitated, so the amount of collision energy absorbed can be increased.

Figure 19:
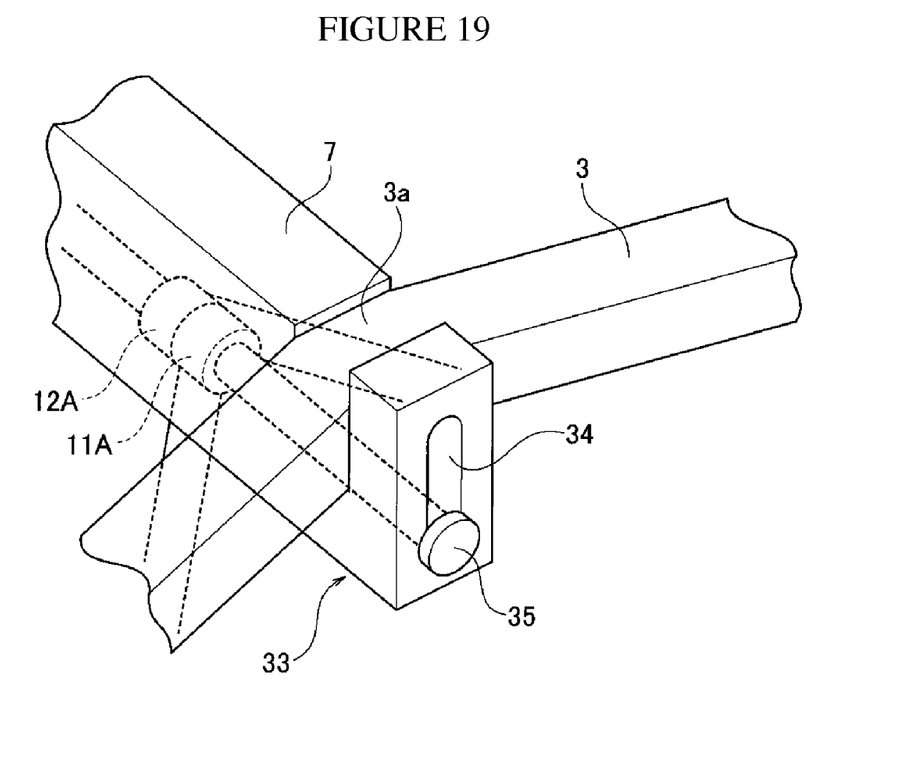
FIG. 19 is an enlarged oblique view illustrating a main portion of an example of a slide mechanism part in a tank-carrying vehicle rear body structure in a fifth embodiment of the invention.

FIG. 19 is an enlarged oblique view illustrating the main portion of an example of a slide mechanism part in the tank-carrying vehicle rear body structure in a fifth embodiment of the invention. FIGS. 20-23 show a series of operational diagrams illustrating the crushing operation of a rear portion of a vehicle body incorporating the tank-carrying vehicle rear body structure in the fifth embodiment.

The tank-carrying vehicle rear body structure in the fifth embodiment is similar to that in the fourth embodiment. However, different from the fourth embodiment, the fifth embodiment includes a slide mechanism part 33 that moves a support shaft 35 upward under application of the input load F. Support shaft 35 is a common attachment point to which the vehicle rear supporting portion of front-side tank frame 11 and the vehicle front supporting portion of rear-side tank frame 12 are coupled.

As shown in FIG. 19, for slide mechanism part 33, for example, a slide hole 34 is formed on the front-side cross member 7, and the supporting shaft 35 is inserted in the slide hole 34 such that the supporting shaft 35 slides only in the vertical direction with respect to the vehicle body. Here, a rear supporting portion 11A of front-side tank frame 11 and a front supporting portion 12A of rear-side tank frame 12 are supported on the supporting shaft 35.

The low-rigidity portion consisting of a notch or the like formed on front-side cross member 7 in the fourth embodiment is not formed in the fifth embodiment.

Figure 20:
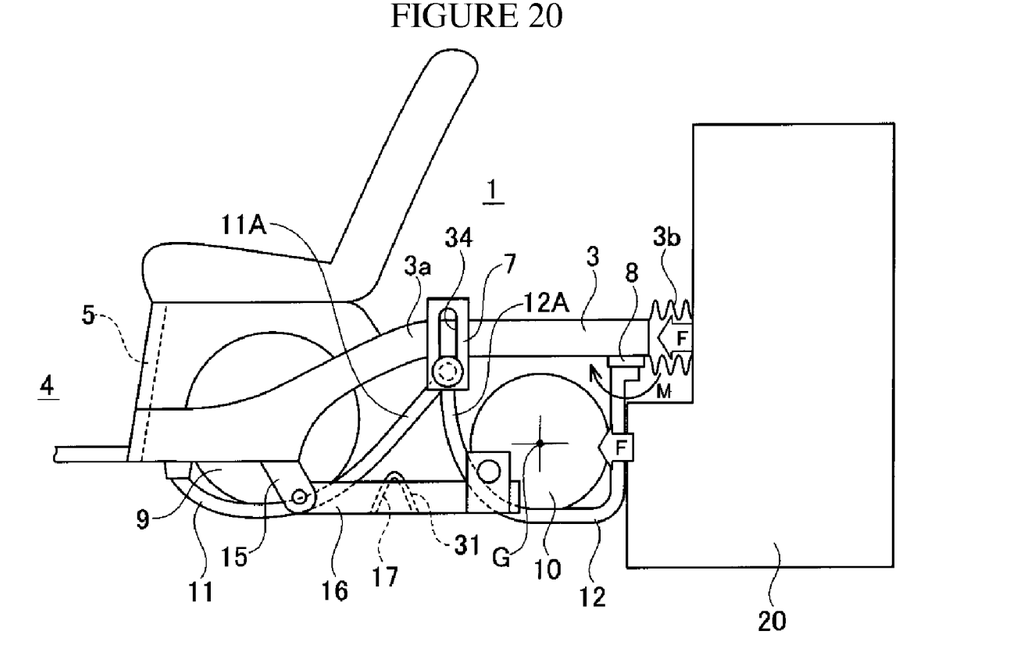
FIG. 20 is a diagram illustrating the initial crushing stage among a series of operational diagrams of the crushing operation of a rear portion of a vehicle body incorporating the tank-carrying vehicle rear body structure in the fifth embodiment.
Figure 21:
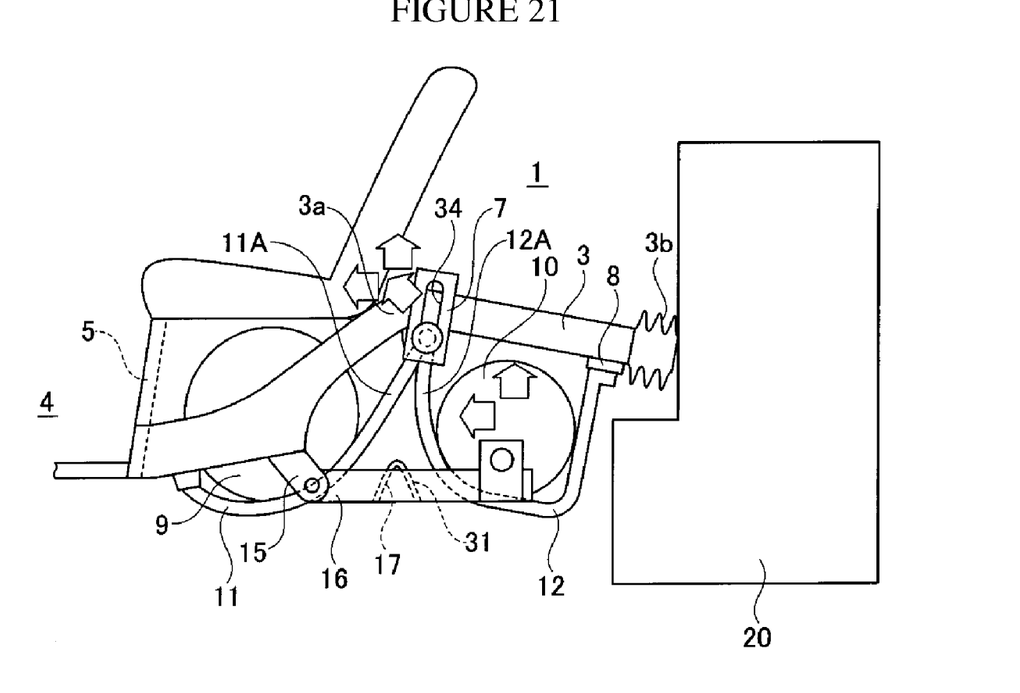
FIG. 21 is a diagram illustrating a former intermediate crushing stage among a series of operational diagrams of the crushing operation of the rear portion of the vehicle body incorporating the tank-carrying vehicle rear body structure in the fifth embodiment.

In the tank-carrying vehicle rear body structure in the fifth embodiment, as shown in FIG. 20, when input load F is applied from behind the vehicle body toward the front of the vehicle, under the force acting on rear-side tank frame 12, supporting shaft 35 connected to front supporting portion 12A slides upward with respect to the vehicle along the slide hole 34. As a result, as shown in FIG. 21, rear side member 3 is pressed by the supporting shaft 35, and it is folded to a nearly V-shape around kick-up portion 3a.

Figure 22:
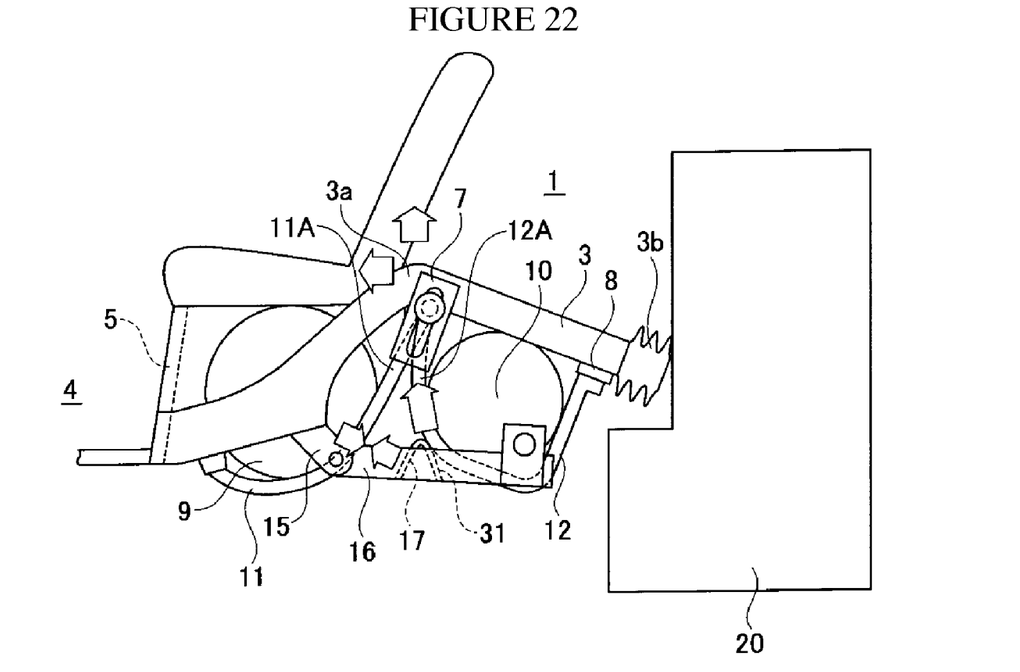
FIG. 22 is a diagram illustrating a later intermediate crushing stage among a series of operational diagrams of the crushing operation of the rear portion of the vehicle body incorporating the tank-carrying vehicle rear body structure in the fifth embodiment.
Figure 23:
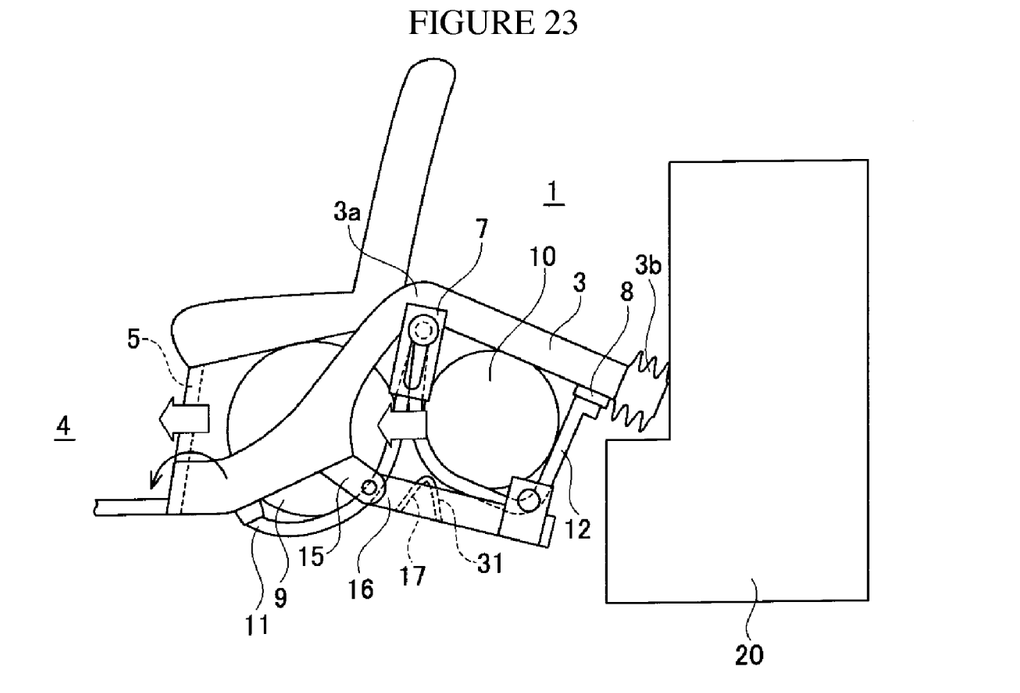
FIG. 23 is a diagram illustrating a later crushing stage among the series of operational diagrams of the crushing operation of the rear portion of the vehicle body incorporating the tank-carrying vehicle rear body structure in the fifth embodiment.

Then, as shown in FIG. 22, rear-side gas tank 10 and rear-side tank frame 12 collide with torsion beam 17, so that along with rear side members 3, they are further folded upward with respect to the vehicle body. Finally, as shown in FIG. 23, rear-side gas tank 10 and rear-side tank frame 12 contact front-side gas tank 9 and front-side tank frame 11.

In the fifth embodiment, the portion of the common attachment point of rear supporting portion 11A of front-side tank frame 11 and front supporting portion 12A of rear-side tank frame 12 is driven to move upward with respect to the vehicle body by slide mechanism part 33, so that rear side members 3 can be folded easily at kick-up portions 3a. Also, according to the fifth embodiment, a counter-moment does not occur, so rear side members 3 can be folded at kick-up portions 3a with a smaller force.

Also, in the fifth embodiment, rear supporting portion 11A of front-side tank frame 11 and front supporting portion 12A of rear-side tank frame 12 are adopted as a common attachment point. The space required in the longitudinal direction of the vehicle for carrying the tank is minimized, and, at the same time, folding of rear side members 3 is facilitated, so the amount of collision energy absorbed can be increased.

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A tank-carrying vehicle rear body structure, comprising:
 a pair of rear side members extending in a longitudinal direction of a body of the vehicle and disposed on opposing sides from each other in a lateral direction of the body;
 a rear tank frame supporting a rear tank at a position below the rear side members and coupled to the rear side members at least at two attachment points spaced apart in the longitudinal direction of the vehicle body, the rear tank frame including a frame member having a closed polygonal cross-section; and
 a member-folding-facilitating part located forward of the rear tank frame and configured and arranged to facilitate folding of the pair of rear side members upon application of a force to the rear body structure and the rear tank frame by deflecting a portion of the force in an upward direction of the body using a rigidity of the rear tank frame, wherein the member-folding-facilitating part is a torsion beam forming a torsion beam rear suspension, the torsion beam located forward of the rear tank.

2. The tank-carrying vehicle rear body structure described in claim 1 wherein:
 each of the pair of rear side members has a bending portion having less rigidity than remaining portions thereof; and wherein
 the rear tank frame includes a front portion coupled to each of the pair of rear side members at a respective attachment point proximate to the bending portion.

3. The tank-carrying vehicle rear body structure described in claim 1 wherein:
 the torsion beam includes a guide surface facing the rear tank frame, the guide surface inclined upward with respect to the vehicle body and forward with respect to the rear tank frame.

4. The tank-carrying vehicle rear body structure described in claim 1, further comprising:
 a front tank frame supporting a front tank and coupled to each of the pair of rear side members at a location forward of the rear tank frame;
 wherein the rear tank frame contacts the front tank frame upon application of the force to the rear body structure.

5. The tank-carrying vehicle rear body structure described in claim 4 wherein:
 the rear tank frame is coupled to a respective one of the pair of rear side members at a first attachment point and a second attachment point, the second attachment point located rearward of the first attachment point;
 the front tank frame is coupled to the respective one of the pair of rear side members at a third attachment point and a fourth attachment point, the fourth attachment point located rearward of the third attachment point;
 and wherein the fourth attachment point and the first attachment point form a common attachment point located at a bending portion of the respective one of the pair of rear side members, the bending portion having less rigidity than remaining portions of the respective one of the pair of rear side members.

6. The tank-carrying vehicle rear body structure described in claim 5 wherein:
 the common attachment point includes a slide mechanism part configured to allow upward movement of the common attachment point with respect to the vehicle body upon application of the force to the rear body structure.

7. A tank-carrying vehicle rear body structure, comprising:
a pair of rear side members extending in a longitudinal direction of a body of the vehicle and disposed on opposing sides from each other in a lateral direction of the body;
a rear tank frame supporting a rear tank at a position below the rear side members and coupled to the rear side members at least at two attachment points spaced apart in the longitudinal direction of the vehicle body;
a member-folding-facilitating part located forward of the rear tank frame and configured and arranged to facilitate folding of the pair of rear side members upon application of a force to the rear body structure; and
a member-folding-facilitating auxiliary part configured to receive the input load and to further facilitate folding of the pair of rear side members, wherein the member-folding-facilitating auxiliary part extends in the lateral direction of the vehicle and includes a first end coupled to each of the pair of rear side members at a position lower than a center of gravity of the rear tank and a second end coupled to the rear tank frame, the member-folding-facilitating auxiliary part inclining upward and rearward from the first end to the second end.

8. The tank-carrying vehicle rear body structure described in claim 7 wherein:
the member-folding-facilitating auxiliary part is a driving mechanism part located between the member-folding-facilitating part and the rear tank frame at a position lower than the center of gravity of the rear tank.

9. The tank-carrying vehicle rear body structure described in claim 8 wherein:
the member-folding-facilitating part is at a higher position than the driving mechanism part with respect to the vehicle body.

10. The tank-carrying vehicle rear body structure described in claim 7 wherein:
each of the pair of rear side members has a bending portion having less rigidity than remaining portions thereof; and wherein
the rear tank frame includes a front portion coupled to each of the pair of rear side members at a respective attachment point proximate to the bending portion.

11. A rear body structure of a tank-carrying vehicle, comprising:
a first rear side member extending in a longitudinal direction of a body of the vehicle and arranged on one side of the body with respect to a lateral direction of the vehicle;
a second rear side member extending in the longitudinal direction of the body and arranged on an opposing side of the body with respect to the lateral direction of the vehicle, the first rear side member and the second rear side member arranged substantially parallel to each other in the longitudinal direction;
a rear tank frame supporting a rear tank at a position below the first and the second rear side members and secured on the rear side members at least at two sites in the longitudinal direction; and
means for facilitating folding of each of the first rear side member and the second rear side member and for facilitating upward pressing by the first and the second rear side members of a front portion of the rear tank frame, the facilitating means responsive to an input load at a rear end portion of the body and moving toward a front of the body.

12. The structure described in claim 11 wherein the first rear side member and the second rear side member each include a bending portion having less rigidity than remaining portions of the respective rear side member; and wherein the front portion of the rear tank frame is secured near each bending portion.

13. The structure described in claim 11 wherein the facilitating means comprises a torsion beam that forms a torsion beam type rear suspension arranged ahead of the rear tank.

14. The structure described in claim 13 wherein the torsion beam slopes backward and upward with respect to the body.

15. The structure described in claim 13, further comprising:
auxiliary means for facilitating folding of each of the first rear side member and the second rear side member responsive to the input load.

16. The structure described in claim 15 wherein the auxiliary facilitating means comprises a plate-shaped connecting member having a first laterally-extending end secured on a rear portion of the rear tank frame and a second laterally-extending end secured on rear end portions of each of the first rear side member and the second rear side member, the plate-shaped connecting member inclined toward a front lower side of the body; and wherein the first laterally-extending end is secured to the rear portion of the rear tank frame at a position lower than a center of gravity of the rear tank.

17. The structure described in claim 15 wherein the auxiliary facilitating means comprises a driving mechanism part sloped toward a front upper side of the body, arranged between the torsion beam and the rear tank frame and located at a position lower than a center of gravity of the rear tank.

18. The structure described in claim 13, further comprising:
a front tank frame located ahead of the rear suspension and supporting a front tank; wherein the first rear side member and the second rear side member each include a bending portion having less rigidity than remaining portions of the respective rear side member, and the rear tank frame and the front tank frame are attached to respective common attachment points on each bending portion.

19. The structure described in claim 18, further comprising:
sliding means for allowing upward movement of the common attachment points under the input load.

* * * * *